US012713030B2

(12) United States Patent
Luo et al.

(10) Patent No.: US 12,713,030 B2
(45) Date of Patent: Aug. 18, 2026

(54) AFFINE MOTION MODEL DERIVATION METHOD

(71) Applicant: InterDigital VC Holdings, Inc., Wilmington, DE (US)

(72) Inventors: Jiancong Luo, Skillman, NJ (US); Yuwen He, San Diego, CA (US); Wei Chen, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/967,158

(22) Filed: Dec. 3, 2024

(65) Prior Publication Data

US 2025/0097429 A1 Mar. 20, 2025

Related U.S. Application Data

(63) Continuation of application No. 18/521,810, filed on Nov. 28, 2023, now Pat. No. 12,200,222, which is a (Continued)

(51) Int. Cl.
*H04N 19/137* (2014.01)
*H04N 19/105* (2014.01)

(Continued)

(52) U.S. Cl.
CPC ......... *H04N 19/137* (2014.11); *H04N 19/105* (2014.11); *H04N 19/149* (2014.11); *H04N 19/176* (2014.11)

(58) Field of Classification Search
CPC .. H04N 19/137; H04N 19/105; H04N 19/149; H04N 19/176

(Continued)

(56) References Cited

U.S. PATENT DOCUMENTS

2018/0077417 A1* 3/2018 Huang .................. H04N 19/70
2018/0137632 A1* 5/2018 Takada ................ G06V 30/248

(Continued)

FOREIGN PATENT DOCUMENTS

CN 107809642 A 3/2018
CN 109155855 A 1/2019

(Continued)

OTHER PUBLICATIONS

Bross, et al., “High Efficiency Video Coding (HEVC) Text Specification Draft 10 (for FDIS and Last Call)”. Joint Collaborative Team on Video Coding (JCT-VC), Document No. JCTVC-L1003, Jan. 2013, 310 pages.

(Continued)

*Primary Examiner* — Matthew David Kim
(74) *Attorney, Agent, or Firm* — Klintworth & Rozenblat LLP

(57) ABSTRACT

Systems and methods are described for video coding using affine motion prediction. In an example method, motion vector gradients are determined from respective motion vectors of a plurality of neighboring sub-blocks neighboring a current block. An estimate of at least one affine parameter for the current block is determined based on the motion vector gradients. An affine motion model is determined based at least in part on the estimated affine parameter(s), and a prediction of the current block is generated using the affine motion model. The estimated parameter(s) may be used in the affine motion model itself. Alternatively, the estimated parameter(s) may be used in a prediction of the affine motion model. In some embodiments, only neighboring sub-blocks above and/or to the left of the current block are used in estimating the affine parameter(s).

12 Claims, 11 Drawing Sheets

Related U.S. Application Data continuation of application No. 17/434,974, filed as application No. PCT/US2020/020441 on Feb. 28, 2020, now Pat. No. 11,870,997.

(60) Provisional application No. 62/814,125, filed on Mar. 5, 2019.

(51) Int. Cl.
*H04N 19/149* (2014.01)
*H04N 19/176* (2014.01)

(58) Field of Classification Search
USPC ..................................................... 375/240.02
See application file for complete search history.

(56) References Cited

U.S. PATENT DOCUMENTS

| | | | | |
|---|---|---|---|---|
| 2018/0192047 | A1* | 7/2018 | Lv | H04N 19/54 |
| 2018/0270500 | A1 | 9/2018 | Li | |
| 2018/0316929 | A1* | 11/2018 | Li | H04N 19/573 |
| 2019/0017811 | A1* | 1/2019 | Watanabe | C12M 1/34 |
| 2019/0028731 | A1* | 1/2019 | Chuang | H04N 19/176 |
| 2019/0045192 | A1* | 2/2019 | Socek | H04N 19/573 |
| 2019/0045214 | A1* | 2/2019 | Ikai | H04N 19/52 |
| 2019/0230350 | A1* | 7/2019 | Chen | H04N 19/139 |
| 2019/0335172 | A1* | 10/2019 | Zhao | H04N 19/119 |
| 2021/0368172 | A1* | 11/2021 | Lim | H04N 19/46 |

FOREIGN PATENT DOCUMENTS

| | | | |
|---|---|---|---|
| WO | 2017157259 | A1 | 9/2017 |
| WO | 2018067823 | A1 | 4/2018 |
| WO | 2019010156 | A1 | 1/2019 |

OTHER PUBLICATIONS

International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.

International Search Report and Written Opinion of the International Searching Authority for PCT/US2020/020441, mailed May 12, 2020, 10 pages.

Ghaznavi-Youvalari, Ramin, et. al., "CE4-related: Merge mode with Regression based Motion Vector Field (RMVF)". Nokia, Joint Video Experts Team (JVET) of ITU-T SG 16 WP 3 and ISO/IEC JTC 1/SC 29/WG 11, JVET-L0171, Oct. 3-12, 2018 (4 pages).

Ghaznavi-Youvalari, Ramin, et. al. "CE2: Merge Mode with Regression-based Motion Vector Field (Test 2.3.3)". Nokia, Joint Video Experts Team (JVET)of ITU-T SG 16 WP 3 and ISO/IEC JTC 1/SC 29/WG 11, JVET-M0302, Jan. 9-18, 2019 (5 pages).

He, Yuwen, et. al., "CE4-Related: Affine Motion Estimation Improvements". InterDigital Communications, Inc., Joint Video Experts Team (JVET) of ITU-T SG 16 WP 3 and ISO/IEC JTC 1/SC 29/WG 11, JVET-L0260-r2, Oct. 3-12, 2018, 4 pages.

Chen, Wei, et al., "CE2-Related: Affine Motion Model Derivation Method for Affine Merge Mode". InterDigital Communications, Inc., Joint Video Experts Team (JVET) of ITU-T SG 16 WP 3 and ISO/IEC JTC 1/SC 29/WG 11, JVET-N0456, Mar. 19-27, 2019 (4 pages).

Wikipedia, "Sobel Filter". Wikipedia web article available at: https://en.wikipedia.org/w/index.php?title=Sobel_operator&oldid=837616168, updated on Apr. 21, 2018, 9 pages.

International Preliminary Report on Patentability for PCT/US2020/20441 issued on Aug. 25, 2021, (7 pages).

Segall, Andrew, et al., "Joint Call for Proposals on Video Compression with Capability beyond HEVC". Joint Video Exploration Team (JVET) of ITU-T SG 16 WP 3 and ISO/IEC JTC 1/SC 29/WG 11, JVET-H1002, Oct. 18-24, 2017 (28 pages).

Bross, Benjamin, et al., "Versatile Video Coding (Draft 2)". Joint Video Experts Team (JVET) of ITU-T SG 16 WP 3 and ISO/IEC JTC 1/SC 29/WG 11, JVET-K1001-v6, Jul. 10-18, 2018 (139 pages).

SMPTE Standard "VC-1 Compressed Video Bitstream Format and Decoding Process". The society of motion picture and television engineers, SMPTE 421M, 2006, (493 pages).

Ghaznavi-Youvalari, Ramin, et. al., "Adaptive motion vector prediction for omnidirectional video". IEEE Visual Communications and Image Processing (VCIP), 2018 (4 pages).

Chen, Jianle, et al. "Algorithm description for Versatile Video Coding and Test Model 3 (VTM 3)". Joint Video Experts Team (JVET) of ITU-T SG 16 WP 3 and ISO/IEC JTC 1/SC 29/WG 11, Document No. JVET-L1002-v1, 12th Meeting: Macao, CN, Oct. 3-12, 2018 (48 pages).

* cited by examiner

AFFINE MOTION MODEL DERIVATION METHOD

CROSS-REFERENCE TO RELATED APPLICATIONS

The present application is a continuation of U.S. patent application Ser. No. 18/521,810, filed Nov. 28, 2023, which is a continuation of U.S. patent application Ser. No. 17/434,974, filed Aug. 30, 2021, which is a national stage application under 35 U.S.C. § 371 of International Application No. PCT/US2020/020441, entitled "AFFINE MOTION MODEL DERIVATION METHOD" filed on Feb. 28, 2020, which claims benefit under 35 U.S.C. § 119 (e) from U.S. Provisional Patent Application Ser. No. 62/814,125, entitled "Affine Motion Model Derivation Method," filed Mar. 5, 2019, all of which are hereby incorporated by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG-1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

In October 2017, the joint call for proposals (CfP) on video compression with capability beyond HEVC was issued by ITU-T and ISO/IEC. In April 2018, 22 CfP responses for standard dynamic range category were received and evaluated at the 10-th JVET meeting, with demonstrated compression efficiency gain over HEVC around 40%. Based on such evaluation results, the Joint Video Expert Team (JVET) launched a new project to develop the new generation video coding standard that is named Versatile Video Coding (VVC). In the same month, one reference software codebase, called VVC test model (VTM), was established for demonstrating a reference implementation of the VVC standard. For the initial VTM-1.0, most coding modules, including intra prediction, inter prediction, transform/inverse transform and quantization/de-quantization, and in-loop filters follows the existing HEVC design, with an exception that a multi-type tree based block partitioning structure is used in the VTM. Meanwhile, to facilitate the assessment of new coding tools, another reference software base called benchmark set (BMS) was also generated. In the BMS codebase, a list of coding tools inherited from the JEM, which provides higher coding efficiency and moderate implementation complexity, are included on top of the VTM and used as the benchmark when evaluating similar coding technologies during the WVC standardization process. Specifically, there are 9 JEM coding tools integrated in the BMS-1.0, including 65 angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and linear model (LM) chroma mode.

SUMMARY

Embodiments described herein include methods that are used in video encoding and decoding (collectively "coding").

In some embodiments, a method includes: for at least one current block in a video, determining at least one motion vector gradient from respective motion vectors of a plurality of neighboring sub-blocks neighboring the current block; determining an estimate of at least one affine parameter for the current block based on the at least one motion vector gradient; determining an affine motion model based at least in part on the determined estimate of the affine parameter; and generating a prediction of the current block using the affine motion model.

In some embodiments, determining an affine motion model comprises determining a plurality of affine parameters of the affine motion model, and the determined estimate is used as at least one of the plurality of affine parameters.

In some embodiments, determining an affine motion model comprises determining a plurality of affine parameters of an affine motion model predictor, wherein the determined estimate is used as at least one of the plurality of affine parameters of the affine motion model predictor; wherein the affine motion model is predicted using the affine motion model predictor.

In some embodiments, determining an affine motion model comprises: determining an initial motion model using the determined estimate of the affine parameter; providing the initial motion model as an input to an optical-flow-based affine model refinement process; and generating the affine motion model using the affine model refinement process.

In some embodiments, generating the prediction of the current block includes determining a sub-block motion vector of at least one sub-block in the current block based on the affine motion model.

In some embodiments, the sub-block motion vector of at least one sub-block is determined according to $$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix}; \text{ and}$$

wherein the determined estimate is used as at least one of the values $a_{xx}$, $a_{xy}$, $a_{yx}$, or $a_{yy}$.

In some embodiments, the sub-block motion vector of at least one sub-block is determined according to $$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix}; \text{ and}$$

wherein the determined estimate is used as a predictor for least one of the values $a_{xx}$, $a_{xy}$, $a_{yx}$, Or $a_{yy}$.

In some embodiments, the method further includes, at an encoder: calculating a residual representing a difference between an input block and the prediction of the current block; and encoding the residual in a bitstream.

In some embodiments, the method further includes, at a decoder: decoding from a bitstream a residual associated with the current block; and reconstructing the current block by adding the residual to the affine prediction.

In some embodiments, the affine parameter is $a_{pq}$, where p and q are each directions selected from the group consisting of x and y, and wherein the determined estimate of $a_{pq}$ is an average of q-direction gradients of p-components of motion vectors of the plurality of neighboring sub-blocks.

In additional embodiments, encoder and decoder apparatus are provided to perform the methods described herein. An encoder or decoder apparatus may include a processor configured to perform the methods described herein. The apparatus may include a computer-readable medium (e.g. a non-transitory medium) storing instructions for performing the methods described herein. In some embodiments, a computer-readable medium (e.g. a non-transitory medium) stores a video encoded using any of the methods described herein.

EXAMPLE NETWORKS FOR IMPLEMENTATION OF THE EMBODIMENTS

Figure 1A:
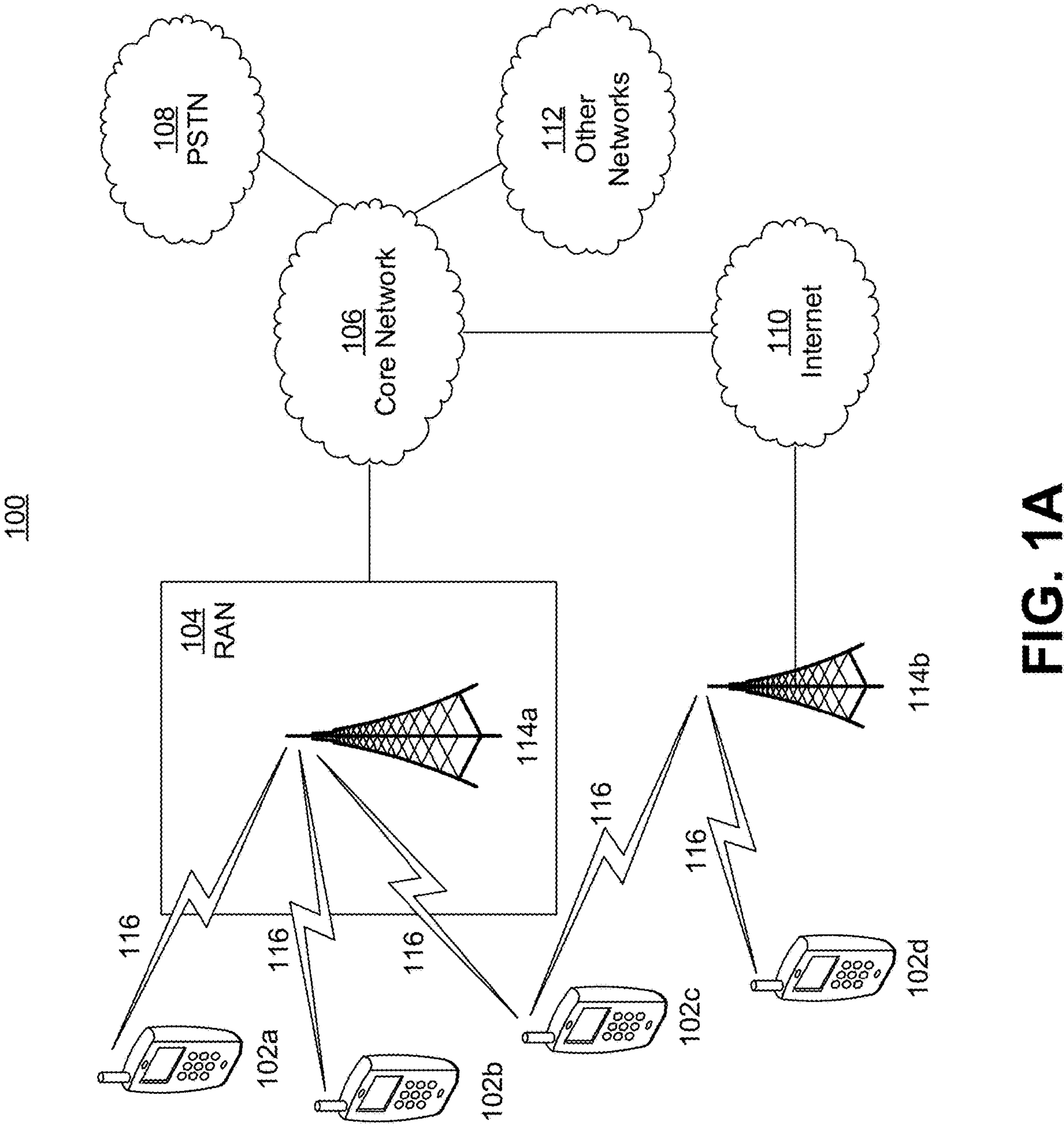
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
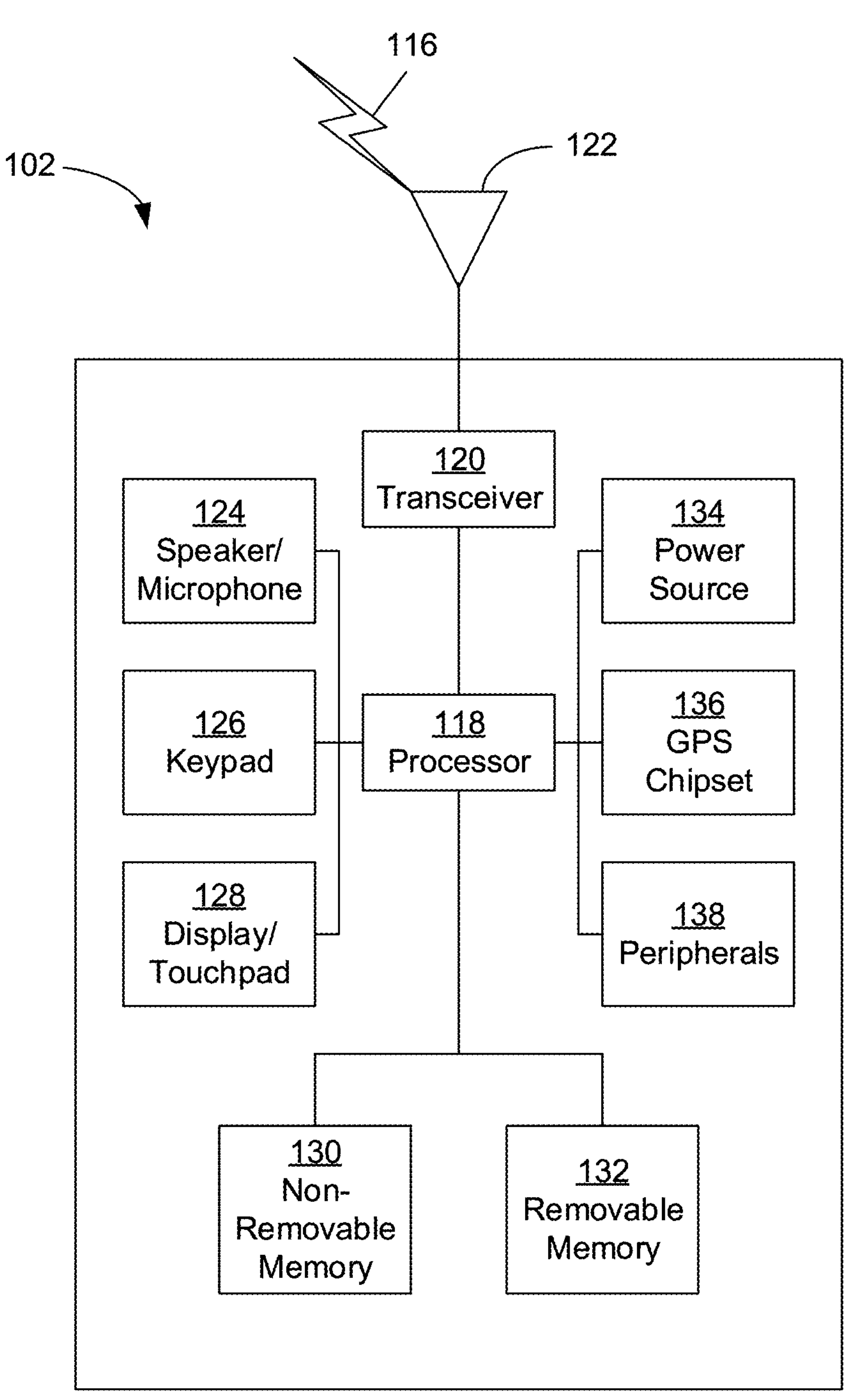
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Block-Based Video Coding.

Figure 2A:
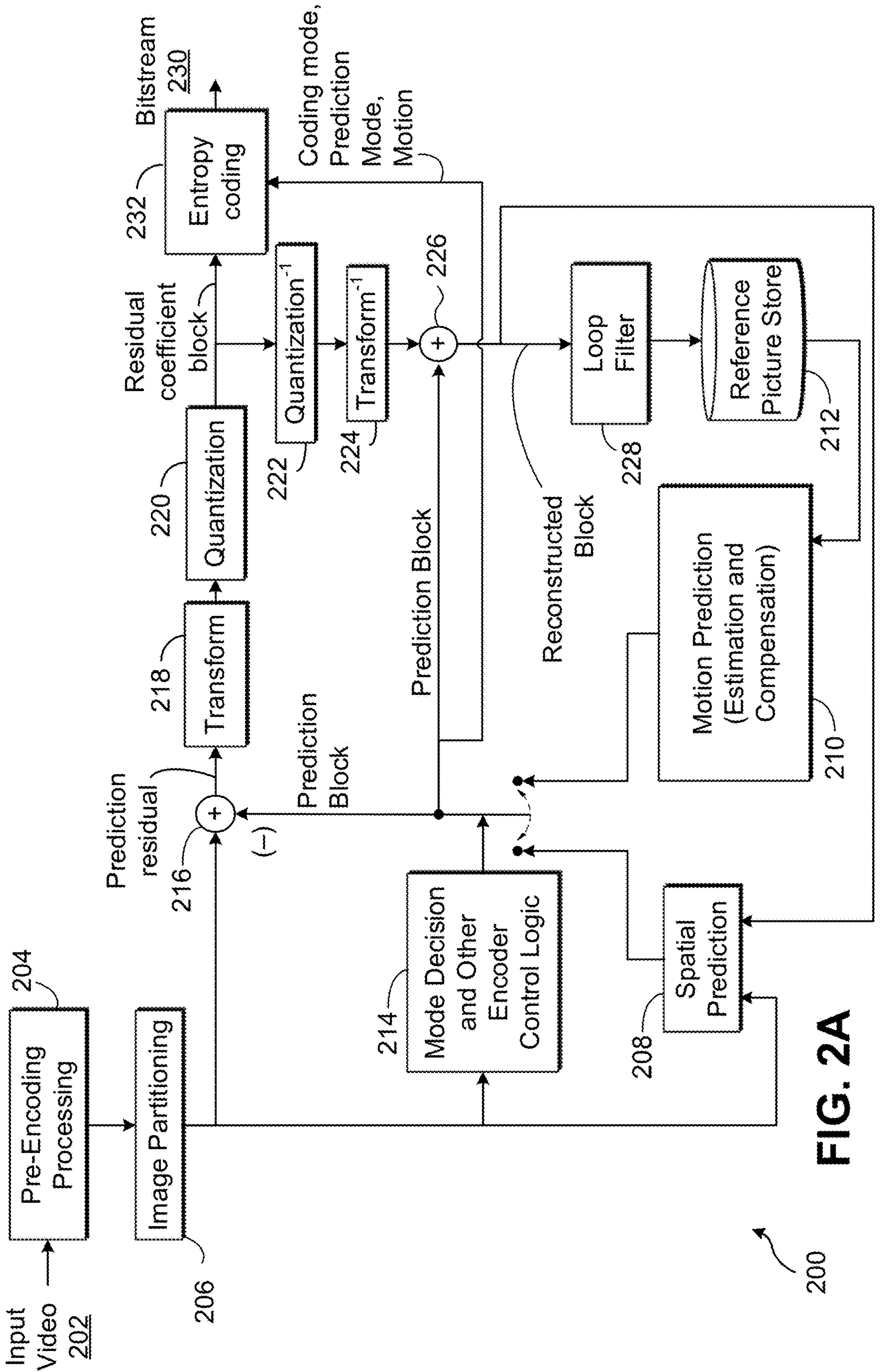
FIG. 2A is a functional block diagram of block-based video encoder, such as an encoder used for VVC.

Like HEVC, the WVC is built upon the block-based hybrid video coding framework. FIG. 2A gives the block diagram of a block-based hybrid video encoding system 200. Variations of this encoder 200 are contemplated, but the encoder 200 is described below for purposes of clarity without describing all expected variations.

Before being encoded, a video sequence may go through pre-encoding processing (204), for example, applying a color transform to an input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

The input video signal 202 including a picture to be encoded is partitioned (206) and processed block by block in units of, for example, CUs. Different CUs may have different sizes. In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, such that the separation of CU, prediction unit (PU) and transform unit (TU) does not exist in the VVC-1.0 anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. Different splitting types may be used, such as quaternary partitioning, vertical binary partitioning, horizontal binary partitioning, vertical ternary partitioning, and horizontal ternary partitioning.

In the encoder of FIG. 2A, spatial prediction (208) and/or temporal prediction (210) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU may be signaled by one or more motion vectors (MVs) which indicate the amount and the direction of motion between the current CU and its temporal reference. Also, if multiple reference pictures are supported, a reference picture index may additionally be sent, which is used to identify from which reference picture in the reference picture store (212) the temporal prediction signal comes.

The mode decision block (214) in the encoder chooses the best prediction mode, for example based on a rate-distortion optimization method. This selection may be made after spatial and/or temporal prediction is performed. The intra/inter decision may be indicated by, for example, a prediction mode flag. The prediction block is subtracted from the current video block (216) to generate a prediction residual. The prediction residual is de-correlated using transform (218) and quantized (220). (For some blocks, the encoder may bypass both transform and quantization, in which case the residual may be coded directly without the application of the transform or quantization processes.) The quantized residual coefficients are inverse quantized (222) and inverse transformed (224) to form the reconstructed residual, which is then added back to the prediction block (226) to form the reconstructed signal of the CU. Further in-loop filtering, such as deblocking/SAO (Sample Adaptive Offset) filtering, may be applied (228) on the reconstructed CU to reduce encoding artifacts before it is put in the reference picture store (212) and used to code future video blocks. To form the output video bit-stream 230, coding mode (inter or intra), prediction mode information, motion information, and quantized residual coefficients are all sent to the entropy coding unit (108) to be further compressed and packed to form the bit-stream.

Figure 2B:
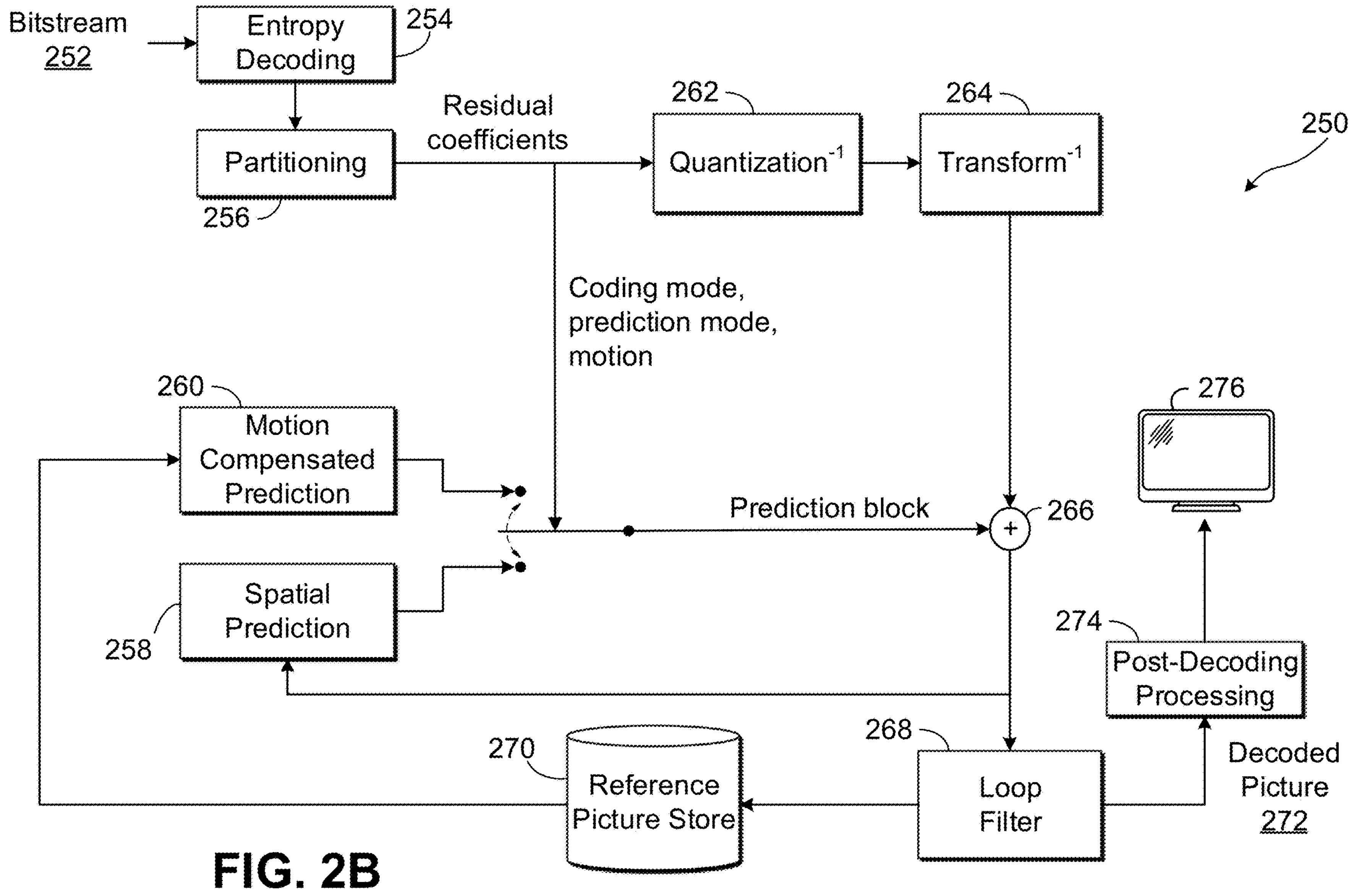
FIG. 2B is a functional block diagram of a block-based video decoder, such as a decoder used for VVC.

FIG. 2B gives a block diagram of a block-based video decoder 250. In the decoder 250, a bitstream is decoded by the decoder elements as described below. Video decoder 250 generally performs a decoding pass reciprocal to the encoding pass as described in FIG. 2A. The encoder 200 also generally performs video decoding as part of encoding video data.

In particular, the input of the decoder includes a video bitstream 252, which can be generated by video encoder 200. The video bit-stream 252 is first unpacked and entropy decoded at entropy decoding unit 254 to obtain transform coefficients, motion vectors, and other coded information. Picture partition information indicates how the picture is partitioned. The decoder may therefore divide (256) the picture according to the decoded picture partitioning information. The coding mode and prediction information are sent to either the spatial prediction unit 258 (if intra coded) or the temporal prediction unit 260 (if inter coded) to form the prediction block. The residual transform coefficients are sent to inverse quantization unit 262 and inverse transform unit 264 to reconstruct the residual block. The prediction block and the residual block are then added together at 266 to generate the reconstructed block. The reconstructed block may further go through in-loop filtering 268 before it is stored in reference picture store 270 for use in predicting future video blocks.

The decoded picture 272 may further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream. The decoded, processed video may be sent to a display device 276. The display device 276 may be a separate device from the decoder 250, or the decoder 250 and the display device 276 may be components of the same device.

Various methods and other aspects described in this disclosure can be used to modify modules of a video encoder 200 or decoder 250. Moreover, the systems and methods disclosed herein are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this disclosure can be used individually or in combination.

Affine Mode.

In HEVC, only a translational motion model is applied for motion compensated prediction, while in the real world, there are many kinds of motion: e.g. zoom in/out, rotation, perspective motions and other irregular motions. In VTM-2.0, an affine motion compensated prediction is applied. The affine motion model is either 4-parameter or 6-parameter. A first flag for each inter coded CU is signaled to indicate whether the translation motion model or the affine motion model is applied for inter prediction. If it is affine motion model, a second flag is sent to indicate whether it is 4-parameter or 6-parameter model.

Figure 3B:
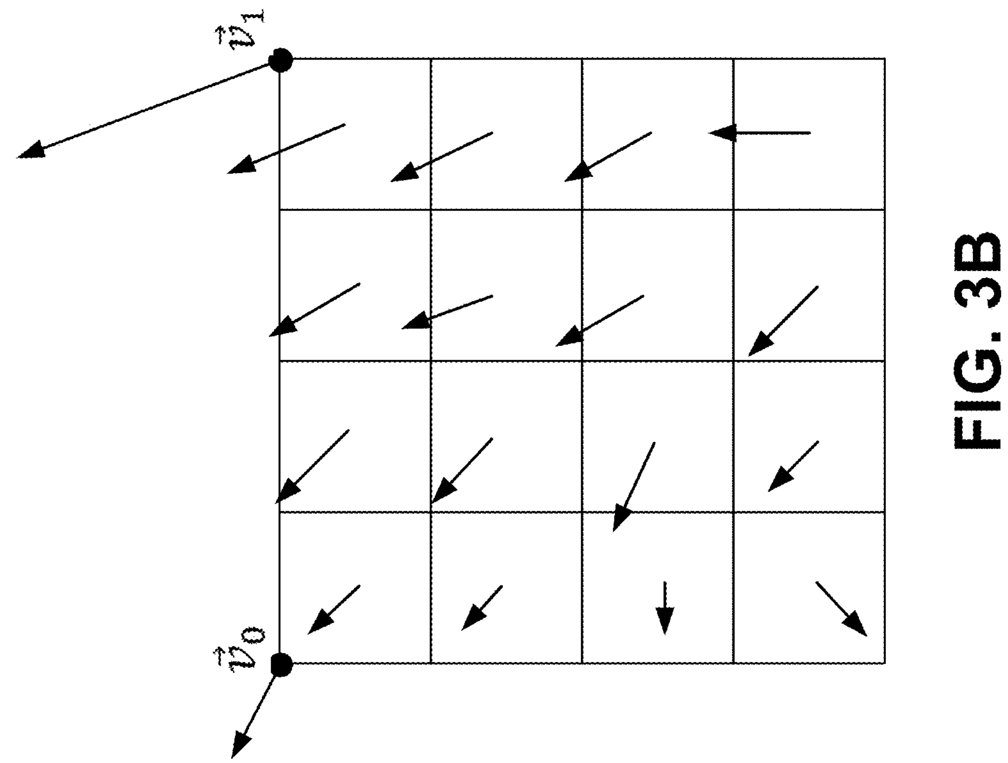
FIGS. 3A-3B illustrate a four-parameter affine motion model, including the affine model (FIG. 3A) and the sub-block-level motion derivation for affine blocks (FIG. 3B).
Figure 3A:
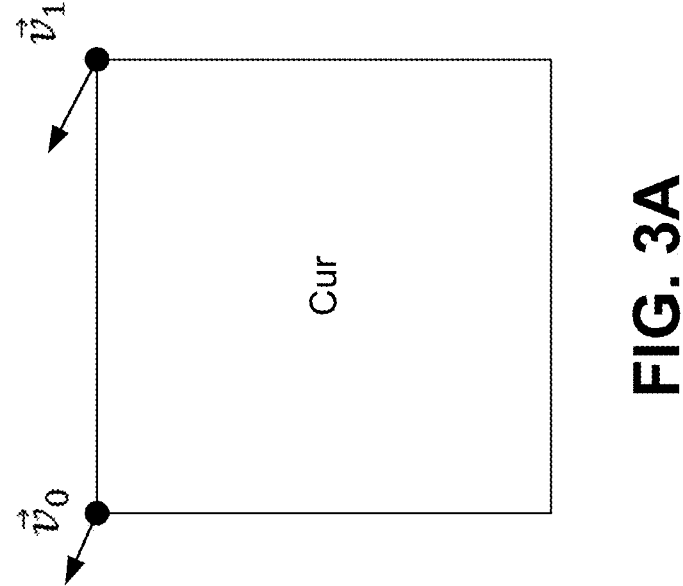

An affine motion model with four parameters may have the following parameters: two parameters for translational movement in horizontal and vertical directions, one parameter for zoom motion for both directions, and one parameter for rotational motion for both directions. The horizontal zoom parameter is equal to the vertical zoom parameter. The horizontal rotation parameter is equal to the vertical rotation parameter. The four-parameter affine motion model is coded in VTM using two motion vectors at two control point positions defined at top-left corner and top-right corner of the current CU. As shown in FIG. 3A, the affine motion field of the block is described by two control point motion vectors ($V_0$, $V_1$). Based on the control point motion, the motion field ($v_x$, $v_y$) of an affine coded block may be described as $$v_x = \frac{(v_{1x}-v_{0x})}{w}x - \frac{(v_{1y}-v_{0y})}{w}y + v_{0x} \qquad (1)$$
$$v_y = \frac{(v_{1y}-v_{0y})}{w}x + \frac{(v_{1x}-v_{0x})}{w}y + v_{0y}$$

Where ($v_{0x}$, $v_{0y}$) is motion vector of the top-left corner control point, and ($v_{1x}$, $v_{1y}$) is motion vector of the top-right corner control point, as shown in FIG. 3A, and w is the width of the CU. In VTM-2.0, the motion field of an affine coded CU is derived at the 4×4 block level; that is, ($v_x$, $v_y$) is derived for each of the 4×4 blocks within the current CU and applied to the corresponding 4×4 block, as shown in FIG. 3B.

In some coding techniques, the four parameters of the 4-parameter affine model are estimated iteratively. Denote the MV pairs at step k as $$\{(v_{0x}^k, v_{0y}^k), (v_{1x}^k, v_{1y}^k)\},$$

the original luminance signal as I(i, j), and the prediction luminance signal as $I'_k(i, j)$. The spatial gradient $g_x(i, j)$ and $g_y(i, j)$ may be derived with Sobel filter applied on the prediction signal $I'_k(i, j)$ in the horizontal and vertical direction, respectively. The derivative of Eq (1) can be represented as:

$$\begin{cases} dv_x^k(x, y) = c*x - d*y + a \\ dv_y^k(x, y) = d*x + c*y + b \end{cases} \qquad (2)$$

where (a, b) are delta translational parameters and (c, d) are delta zoom and rotation parameters at step k. The delta MV at control points can be derived with its coordinates using Eq. (3) and (4). For example, (0, 0), (w, 0) are coordinates for top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases} \qquad (3)$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \qquad (4)$$

Based on the optical flow equation, the relationship between the change of luminance and the spatial gradient and temporal movement is formulated as:

$$I'_k(i, j) - I(i, j) = g_x(i, j)*dv_x^k(i, j) + g_y(i, j)*dv_y^k(i, j) \qquad (5)$$

Substituting $$dv_x^k(i, j)$$

and $$dv_y^k(i, j)$$

with Eq. (2), we get the equation for parameter (a, b, c, d).

$$I'_k(i, j) - I(i, j) = (g_x(i, j)*i + g_y(i, j)*j)*c + (-g_x(i, j)*j + g_y(i, j)*i)*d + g_x(i, j)*a + g_y(i, j)*b \qquad (6)$$

Since all samples in the CU satisfy Eq. (6), the parameter set (a, b, c, d) can be solved using a least square method. The motion vectors at two control points $$\{(v_{0x}^{k+1}, v_{0y}^{k+1}), (v_{1x}^{k+1}, v_{1y}^{k+1})\}$$

at step (k+1) can be solved with Eq. (3) and (4), and they are rounded to a specific precision (i.e. ¼ pel). Using the iteration, the MVs at two control points can be refined until it converges when parameters (a, b, c, d) are all zeros or the number of iterations meets a pre-defined limit.

Figure 4:
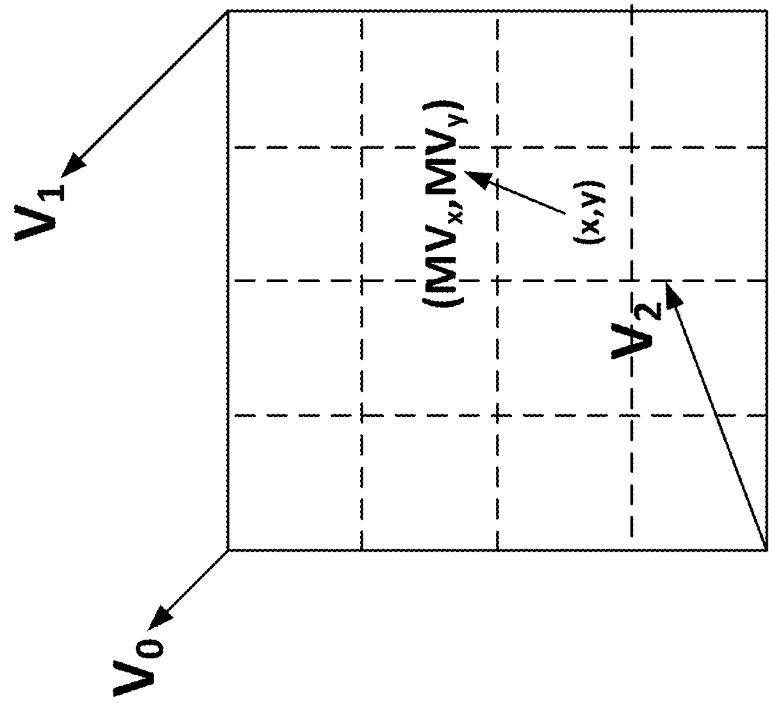
FIG. 4 illustrates a six-parameter affine motion model. V0, V1, and V2 are control points, and (MVx, MVy) is motion vector of the sub-block centered at position (x, y).

An affine motion model with six parameters may have the following parameters: two parameters for translational movement in the horizontal and vertical directions, one parameter for zoom motion and one parameter for rotation motion in the horizontal direction, and one parameter for zoom motion and one parameter for rotation motion in the vertical direction. A 6-parameter affine motion model may be coded with three MVs at three control points. As shown in FIG. 4, three control points for a 6-parameter affine coded CU may be defined at top-left, top-right and bottom left corner of the CU. The motion at the top-left control point is related to translation motion, the motion at the top-right control point is related to rotation and zoom motion in the horizontal direction, and the motion at the bottom-left control point is related to rotation and zoom motion in the vertical direction. For the 6-parameter affine motion model, the rotation and zoom motion in the horizontal direction may not be same as those motions in the vertical direction. The motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h} \tag{7}$$

$$v_y = v_{0y} + (v_{1y} - v_{0y}) * \frac{x}{w} + (v_{2y} - v_{0y}) * \frac{y}{h} \tag{8}$$

where ($v_{2x}$, $v_{2y}$) is motion vector of the bottom-left control point, (x, y) is the center position of sub-block, w and h are the width and height of CU.

The six parameters of the 6-parameter affine model may be estimated in a similar way. The Eq. (2) is changed as follows.

$$\begin{cases} dv_x^k(x, y) = c * x + d * y + a \\ dv_y^k(x, y) = e * x + f * y + b \end{cases} \tag{9}$$

where (a, b) are delta translation parameters, (c, d) are delta zoom and rotation parameters for horizontal direction, and (e, f) are delta zoom and rotation parameters for vertical direction, at step k. The Equation (8) is changed accordingly.

$$I'_k(i, j) - I(i, j) = (g_x(i, j) * i) * c + (g_x(i, j) * j) * d + (g_y(i, j) * i) * e + (g_y(i, j) * j) * f + g_x(i, j) * a + g_y(i, j) * b \tag{10}$$

The parameter set (a, b, c, d, e, f) can be solved using least-square method by considering all samples within CU. The MV of top-left control point $$(v_{0x}^{k+1}, v_{0y}^{k+1})$$

may be calculated with Eq. (3). The MV of top-right control point $$(v_{1x}^{k+1}, v_{1y}^{k+1})$$

may be calculated with Eq. (11). The MV of the top-right control point $$(v_{2x}^{k+1}, v_{2y}^{k+1})$$

may be calculated with Eq. (12).

$$\begin{cases} dv_{1x}^k = (v_{1x}^{k+1} - v_{1x}^k) = c * w + a \\ dv_{1y}^k = (v_{1y}^{k+1} - v_{1y}^k) = e * w + b \end{cases} \tag{11}$$

$$\begin{cases} dv_{2x}^k = (v_{2x}^{k+1} - v_{2x}^k) = d * h + a \\ dv_{2y}^k = (v_{2y}^{k+1} - v_{2y}^k) = f * h + b \end{cases} \tag{12}$$

Regression-Based Motion Vector Field.

To provide a fine granularity of motion vectors inside a block, a Regression based Motion Vector Field (RMVF) tool is proposed in R. Ghaznavi-Youvalari, A. Aminlou, J. Lainema, "CE4-related: Merge mode with Regression based Motion Vector Field (RMVF)", JVET-L0171, October 2018, Macau, China. This tool attempts to model the motion vectors of each block on a sub-block level based on the spatially neighboring motion vectors.

Figure 5A:
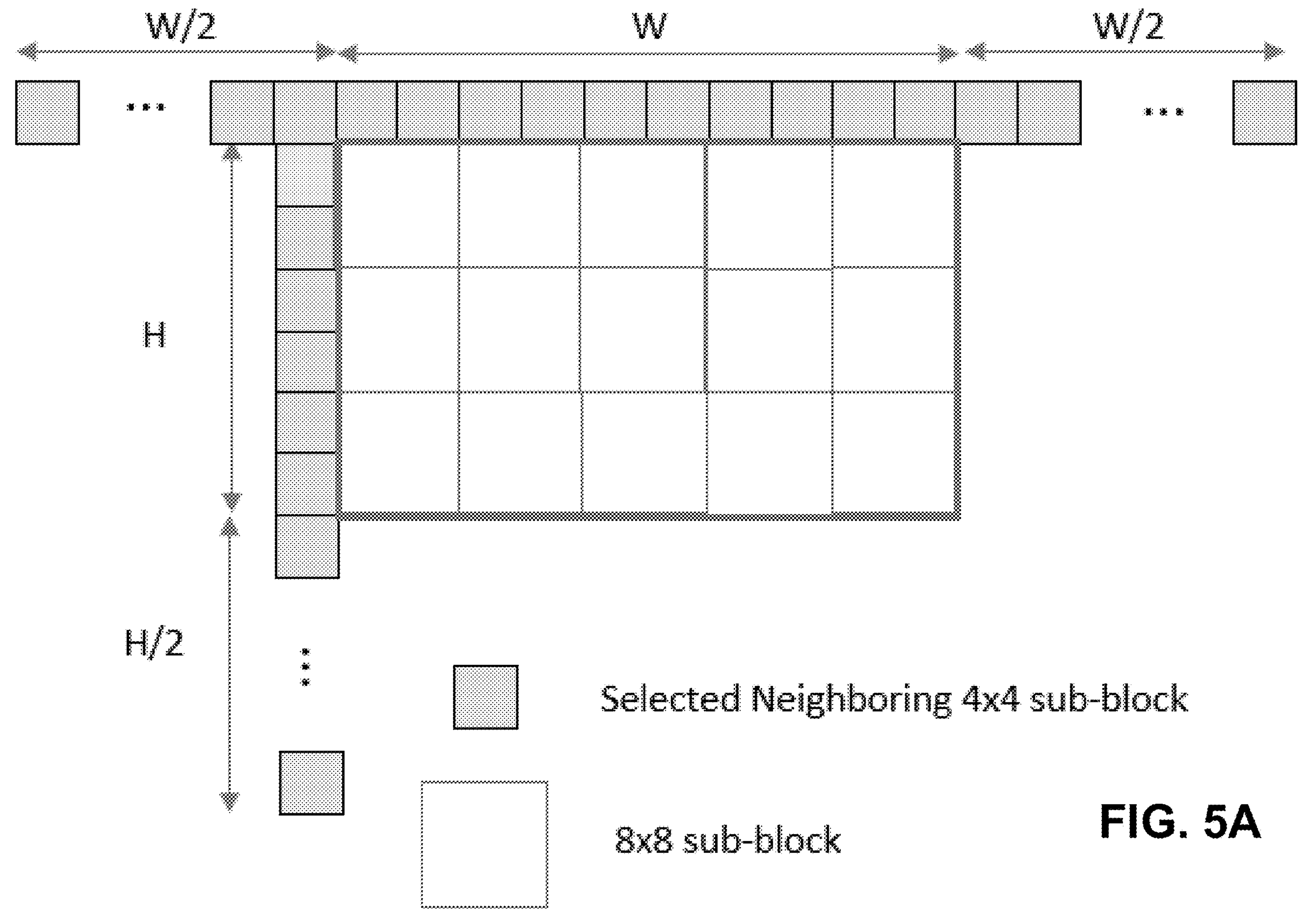
FIG. 5A illustrates neighboring motion vectors that are used in RMVF motion parameter derivation.

FIG. 5A illustrates the neighboring 4×4 motion blocks that are used for motion parameter derivation of the proposed RMVF method. As seen, one line and row of immediate neighboring motion vectors in 4×4 sub-block basis (and their center locations) from each side of the block are used in the regression process.

Figure 5B:
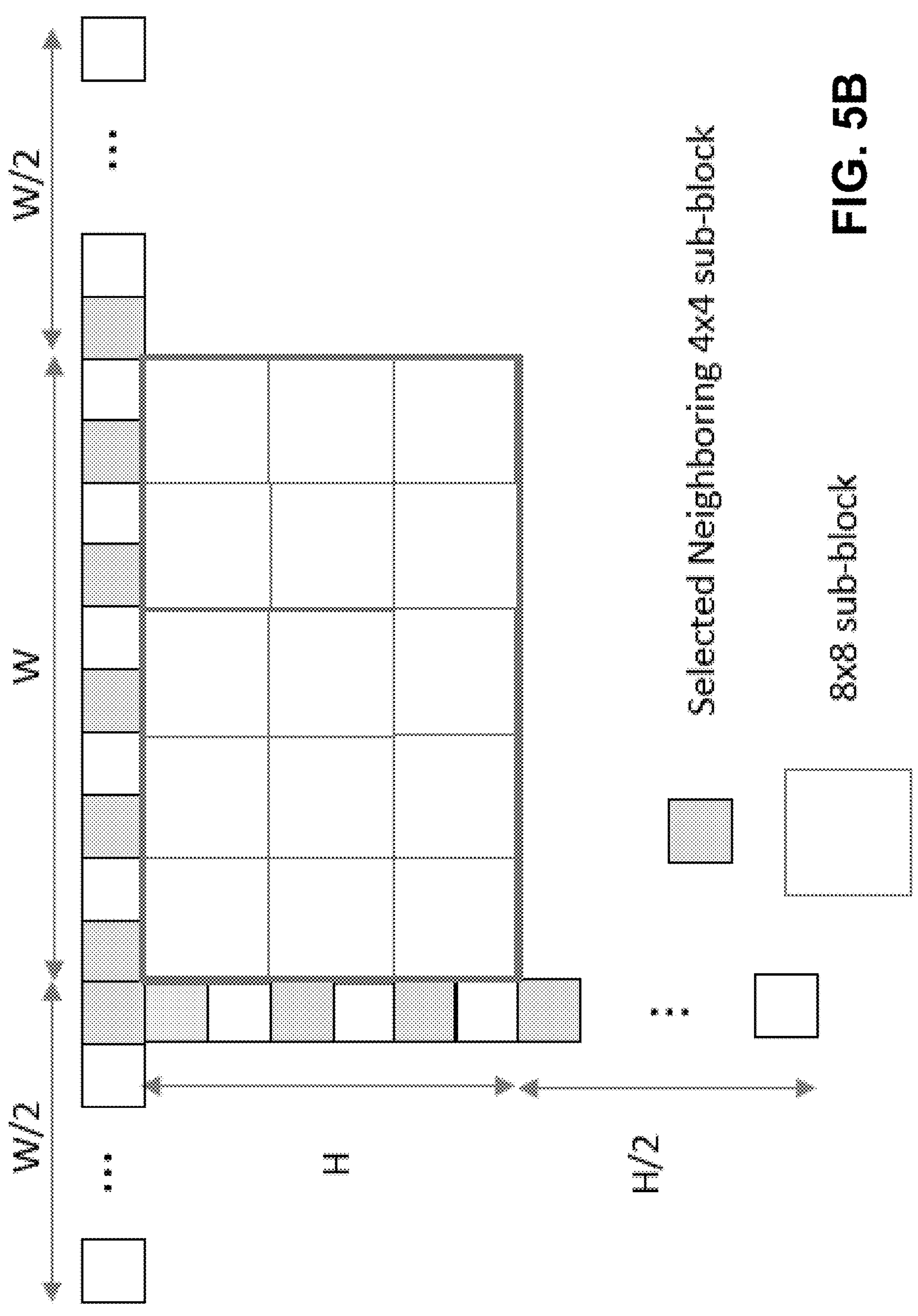
FIG. 5B illustrates reduced neighboring motion vector candidates for RMVF motion parameter derivation.

To reduce the number of neighboring motion information for RMVF parameter derivation, the method of FIG. 5B is used in which almost half of the neighboring 4×4 motion blocks are used for motion parameter derivation.

Five conventional regions (bottom-left, left, top-left, top, top-right) as shown in FIGS. 5A and 5B are used when collecting the motion information for motion parameter derivation. The above-right and bottom-left reference motion regions are limited to only half of the corresponding width or height of the current block.

In RMVF mode, motion of the block is defined by a 6-parameter motion model. These parameters $a_{xx}$, $a_{xy}$, $a_{yx}$, $a_{yy}$, $b_x$ and $b_y$ are calculated by solving a linear regression model in mean square error (MSE) sense. The input to the regression model consists of the center locations (x, y) and motion vectors ($mv_x$ and $mv_y$) of the available neighboring 4×4 sub-blocks as defined above.

The motion vector ($MV_{X\_subPU}$, $MV_{Y\_subPU}$) for an 8×8 sub-block with center location at ($X_{subPU}$, $Y_{subPU}$) is then calculated as:

$$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix} \tag{13}$$

The motion vectors are calculated for 8×8 sub-blocks relative to the center location of each sub-block. Consequently, motion compensation is also applied in 8×8 sub-block accuracy in the RMVF mode.

In order to have efficient modelling for the motion vector field, the RMVF tool is applied only in the cases that at least one motion vector from at least three of the candidate regions are available.

In the design in JVET-L0171, a least mean square error method is used to solve the linear regression problem. The complexity of this process is high. Embodiments described herein may reduce the complexity.

Example Affine Model Parameter Estimation Techniques.

As described above, the regression-based motion vector field method obtains the affine model parameters by resolving linear regression with least mean square (LMS) error, with the input being the motion vectors from neighboring 4×4 sub-blocks. The LMS error method is computationally expensive due to intensive multiplications. To reduce the computational complexity, embodiments described herein operate to estimate the affine model parameters based on the neighboring sub-block MVs without the need for the LMS error method. Giving the affine model defined in Eq. (13), the MV at location at (x, y) can be calculated by:

$$MV_x = a_{xx}x + a_{xy}y + b_x \tag{14}$$
$$MV_y = a_{yx}x + a_{yy}y + b_y$$

And the affine parameter $a_{xx}$, $a_{xy}$, $a_{yx}$, $a_{yy}$ related to zooming and rotation in both directions can be obtained by $$\frac{\partial MV_x}{\partial x} = a_{xx},\ \frac{\partial MV_x}{\partial y} = a_{xy} \tag{15}$$
$$\frac{\partial MV_y}{\partial x} = a_{yx},\ \frac{\partial MV_y}{\partial y} = a_{yy}$$

Figures 6, 7:
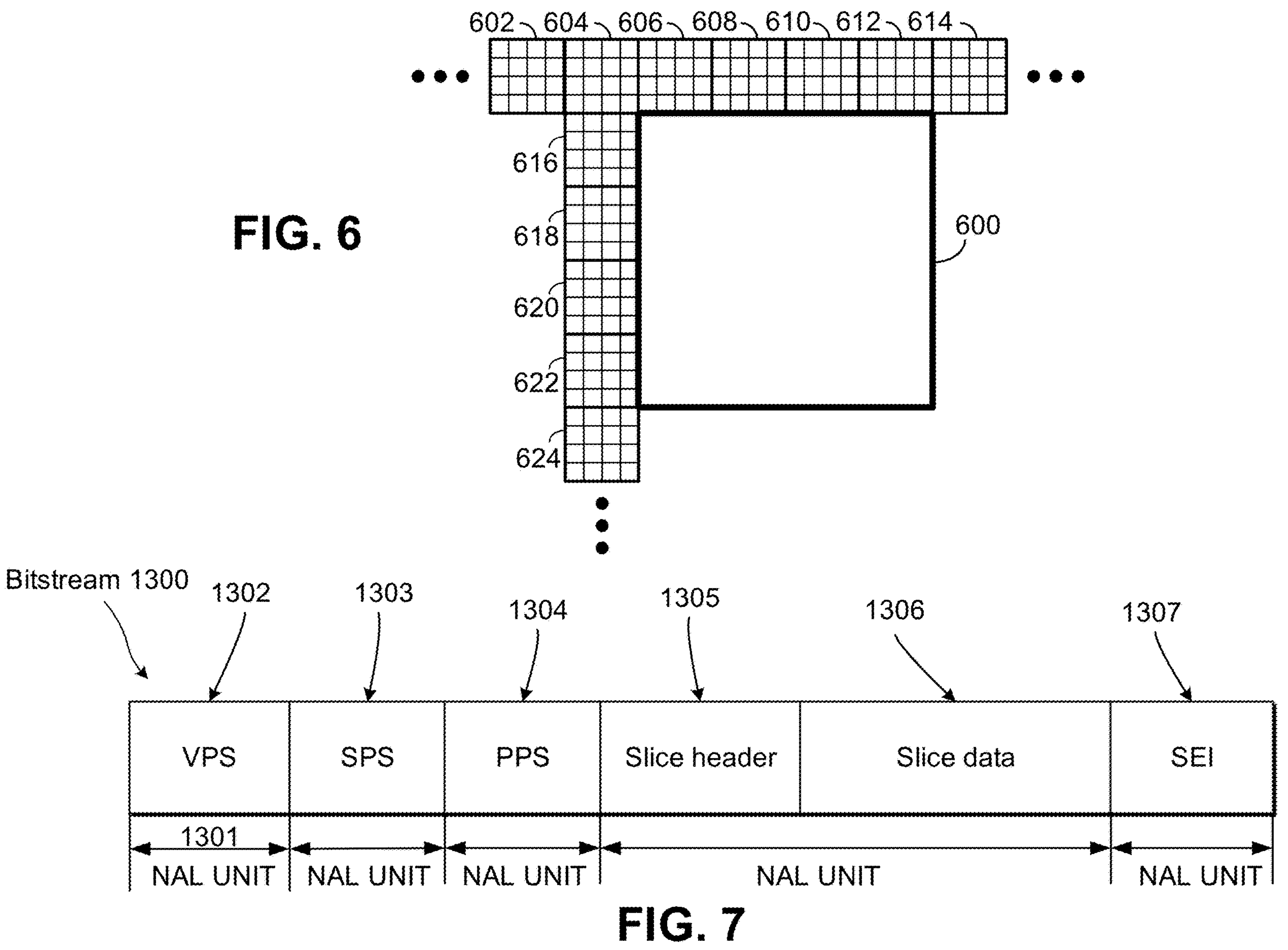
FIG. 6 is a schematic illustration of a current block (current CU) and a plurality of neighboring sub-blocks.
FIG. 7 is a diagram illustrating an example of a coded bitstream structure.

The partial derivatives in some embodiments are approximated by the gradient of the neighboring motion vectors, and one or more of the estimated affine parameters $a'_{xx}$, $a'_{xy}$, $a'_{yx}$, or $a'_{yy}$ may be derived according to the following equations:

$$a'_{xx} = \frac{1}{N-1}\sum_{i=1}^{N-1} g_x\left(MVx_i^T\right) \tag{16}$$
$$a'_{xy} = \frac{1}{M-1}\sum_{i=1}^{M-1} g_y\left(MVx_i^L\right)$$
$$a'_{yx} = \frac{1}{N-1}\sum_{j=1}^{N-1} g_x\left(MVy_j^T\right)$$
$$a'_{yy} = \frac{1}{M-1}\sum_{j=1}^{M-1} g_y\left(MVy_j^L\right)$$

Where $MV^T$ and $MV^L$ are motion vectors of 4×4 blocks from above and left neighboring blocks, respectively, of the current CU. N and M are the number of the above and left neighbors. $g_x$ and $g_y$ are the gradient in horizontal and vertical directions, respectively. FIG. 6 illustrates an example of a current CU 600 to be predicted using an affine motion model. The values $MV^T$ used to estimate affine parameters may include the values of motion vectors of 4×4 blocks 606, 608, 610, and 612 that neighbor the current CU 600 along the top edge thereof. In some embodiments, the values $MV^T$ used to estimate affine parameters may further include additional blocks in the same row as blocks, 606, 608, 610, and 612, such as (among others) additional blocks 602, 604, 614. The values $MV^L$ used to estimate affine parameters may include the values of motion vectors of 4×4 blocks 616, 618, 620, and 622 that neighbor the current CU 600 along the left edge thereof. In some embodiments, the values $MV^L$ used to estimate affine parameters may further include additional blocks in the same column as blocks, 616, 618, 620, and 622, such as additional blocks 604, and 624.

In some instances, a coding unit may include a plurality of sub-blocks. In other instances, a coding unit itself may be considered to be a single sub-block, and a motion vector of the coding unit may be used as a sub-block motion vector according to the embodiments described herein.

The affine parameters $a_{xx}$, $a_{xy}$, $a_{yx}$, and $a_{yy}$ may be represented as $a_{pq}$, where p represents either the x or y direction and q represents either the x or y direction. Consistent with Eq. (16), the estimate of each parameter $a_{pq}$ may be described as an average of q-direction gradients of p-components of motion vectors of the plurality of neighboring sub-blocks.

The gradients $g_x$ and $g_y$, may be estimated in different ways. In one embodiment, $g_x$ is estimated with the motion vectors from the neighboring blocks above the current CU, and $g_y$ is estimated with the motion vectors from neighboring blocks to the left of the current CU, as in the following equations:

$$g_x(MVx_i) = \frac{MVx_i - MVx_{i-1}}{x_i - x_{i-1}} \tag{17}$$
$$g_y(MVy_i) = \frac{MVy_i - MVy_{i-1}}{y_i - y_{i-1}}$$
$$g_x(MVy_i) = \frac{MVy_i - MVy_{i-1}}{x_i - x_{i-1}}$$
$$g_y(MVx_i) = \frac{MVx_i - MVx_{i-1}}{y_i - y_{i-1}}$$

In some embodiments, the estimation of parameters $b_x$ and $b_y$ is performed as follows:

$$b'_x = \overline{MV_x} - a'_{xx}\overline{x} - a'_{xy}\overline{y} \tag{18}$$
$$b'_y = \overline{MV_y} - a'_{yx}\overline{x} - a'_{yy}\overline{y}$$

Where $\overline{MV_x}$, $\overline{MV_y}$, x and y are the average of $MV_x$, $MV_y$, x and y of each neighboring 4×4 block with motion information.

In other embodiments, the estimation of parameters $b_x$ and $b_y$ is performed as follows:

$$b'_x = MV_x^{TL} - a'_{xx}x^{TL} - a'_{xy}y^{TL} \tag{19}$$
$$b'_y = MV_y^{TL} - a'_{yx}x^{TL} - a'_{yy}y^{TL}$$

Where $MV^{TL}$ is the top-left neighbor motion vector and $x^{TL}$ and $y^{TL}$ is the location of the top-left neighbor motion vector.

In some embodiments, it may be desirable to use a 4-parameter affine model instead of a 6-parameter affine model. In a 4-parameter affine model:

$$a_{xx} = a_{yy} \tag{20}$$
$$a_{xy} = -a_{yx}$$

In some embodiments, a 4-parameter affine model is derived by only using motion vectors from the neighboring blocks above the current CU or only the motion vectors from the neighboring blocks to the left of the current CU.

In some embodiments, only the motion vectors from the neighboring blocks above the current CU are used to estimate the affine parameters, as follows:

$$a'_{xx} = \frac{1}{N-1}\sum_{i=1}^{N-1} g_x(MVx_i^T) \quad (21)$$

$$a'_{yx} = \frac{1}{N-1}\sum_{j=1}^{N-1} g_x(MVy_j^T)$$

$$a'_{yy} = a'_{xx}$$

$$a'_{xy} = -a'_{yx}$$

In other embodiments, only the motion vectors from the neighboring blocks to the left of the current CU are used to estimate the affine parameters, as follows:

$$a'_{xy} = \frac{1}{M-1}\sum_{i=1}^{M-1} g_y(MVx_i^L) \quad (22)$$

$$a'_{yy} = \frac{1}{M-1}\sum_{j=1}^{M-1} g_y(MVy_j^L)$$

$$a'_{xx} = a'_{yy}$$

$$a'_{yx} = -a'_{xy}$$

In some embodiments, parameters of a 2-parameter translational motion model are derived by assuming parameters $a_{xx}$, $a_{xy}$, $a_{yx}$ and $a_{yy}$ to be zero. The parameters $b_x$ and $b_y$ may be estimated by averaging the neighboring MVs.

In another embodiment, the 6-parameter affine model, 4-parameter affine model and 2-parameter translation model derived from above or left neighboring blocks are derived and one of them are chosen. One method is to select the model with minimal model fitting error as the optimal model. The model fitting error may be calculated by the sum of the distance between the MV derived by the model candidate and its actual MV for each sub-block. The distance may be measured by the weighted sum of absolute difference (SAD) or the weighted sum of square difference (SSD). For example, given a model parameter ($a_{xx}$, $a_{xy}$, $a_{yx}$, $a_{yy}$, $b_x$, $b_y$), the derived $$MV'_i(MVx'_i, MVy'_i)$$

for i-th neighboring block centered at (x, y) may be calculated with Eq. (14). The distance between the derived $MV'_i$ and the $MV_i$ of i-th neighboring block is calculated as follows.

$$d = \sum_{i=0}^{K} W_i * (|MVx'_i - MVx_i| + |MVy'_i - MVy_i|) \quad (23)$$

Where $W_i$ is the weight for the i-th neighboring block. It is measured by the distance between neighboring block and the current CU. The weight is larger if the neighboring block is closer to the current CU. Techniques as described herein for estimating one or more parameters of an affine motion model may reduce the complexity of affine motion model derivation as compared to RMVF.

Adaptive Sub-Block Size for RMVF Mode.

Using the estimated affine model parameters, the motion vector of the sub-blocks inside the current CU may be derived according to Eq. (14). In some embodiments, the size of sub-blocks may be adaptively determined according to the shape of the current CU. In one embodiment, the sub-blocks have the same aspect ratio as that of the current CU. The minimum lateral size may be set to either 4 or 8. Suppose, for example, that the ratio between CU width and CU height of the current CU is 2:1. Then in this example, the width of sub-block is 8 and the height is 4 if the minimum lateral size is equal to 4. In order to save the memory access bandwidth, the minimum lateral size may be determined by whether uni-prediction or bi-prediction is used. If the current CU is uni-predicted, the minimum lateral size may be set to 4; if the current CU is bi-predicted, the minimum lateral size may be set to 8.

Use of Estimated Affine Motion Parameters.

Affine parameters estimated according to methods as described herein may be used in different ways in different embodiments. In some embodiments, a prediction of the current block is generated using an affine motion model defined by one or more of the estimated affine parameters. For example, the prediction may be generated using the determined estimates of the parameters $a'_{xx}$, $a'_{xy}$, $d'_{yx}$, $d'_{yy}$, $b'_x$, and/or $b'_y$ to define the motion model.

In some embodiments, the estimated parameters $a'_{xx}$, $a'_{xy}$, $a'_{yx}$, $a'_{yy}$, $b'_x$, and/or $b'_y$ are used as predictors of an affine motion model. For example, one or more of the parameters $a'_{xx}$, $a'_{xy}$, $a'_{yx}$, $a'_{yy}$, $b'_x$, and/or $b'_y$ may be estimated and one or more parameter difference values $da_{xx}$, $da_{xy}$, $da_{yx}$, $da_{yy}$, $db_x$, and/or $db_y$ may be signaled in the bitstream. A prediction of the current block may then be generated using an affine motion model in which $$a_{xx} = a'_{xx} + da_{xx},\ a_{xy} = a'_{xy} + da_{xy},$$

$$a_{yx} = a'_{yx} + da_{yx},\ a_{yy} = a'_{yy} + da_{yy},$$

$$b_x = b'_x + db_x, \text{ and } b_y = b'_y + db_y.$$

In another example of an embodiment in which the estimated parameters $a'_{xx}$, $a'_{xy}$, $a'_{yx}$, $a'_{yy}$, $b'_x$, and/or $b'_y$ are used as predictors of an affine motion model, those parameter are used to generate predicted control point motion vectors, and motion vector difference (MVD) values are signaled in the bitstream. The MVD values are added to the predicted control point motion vectors, and the resulting control point motion vectors define an affine motion model that is used to generate a prediction of the current block.

The affine model estimated from motion vectors of neighboring coding blocks may be used as a predictor of the affine model to be estimated for the current CU. It can improve the affine motion estimation without too much of an increase in complexity since the affine motion model parameter derivation is greatly reduced. After affine model predictor selection, optical-flow-based estimation or refinement may be applied.

Figures 9A, 9B:
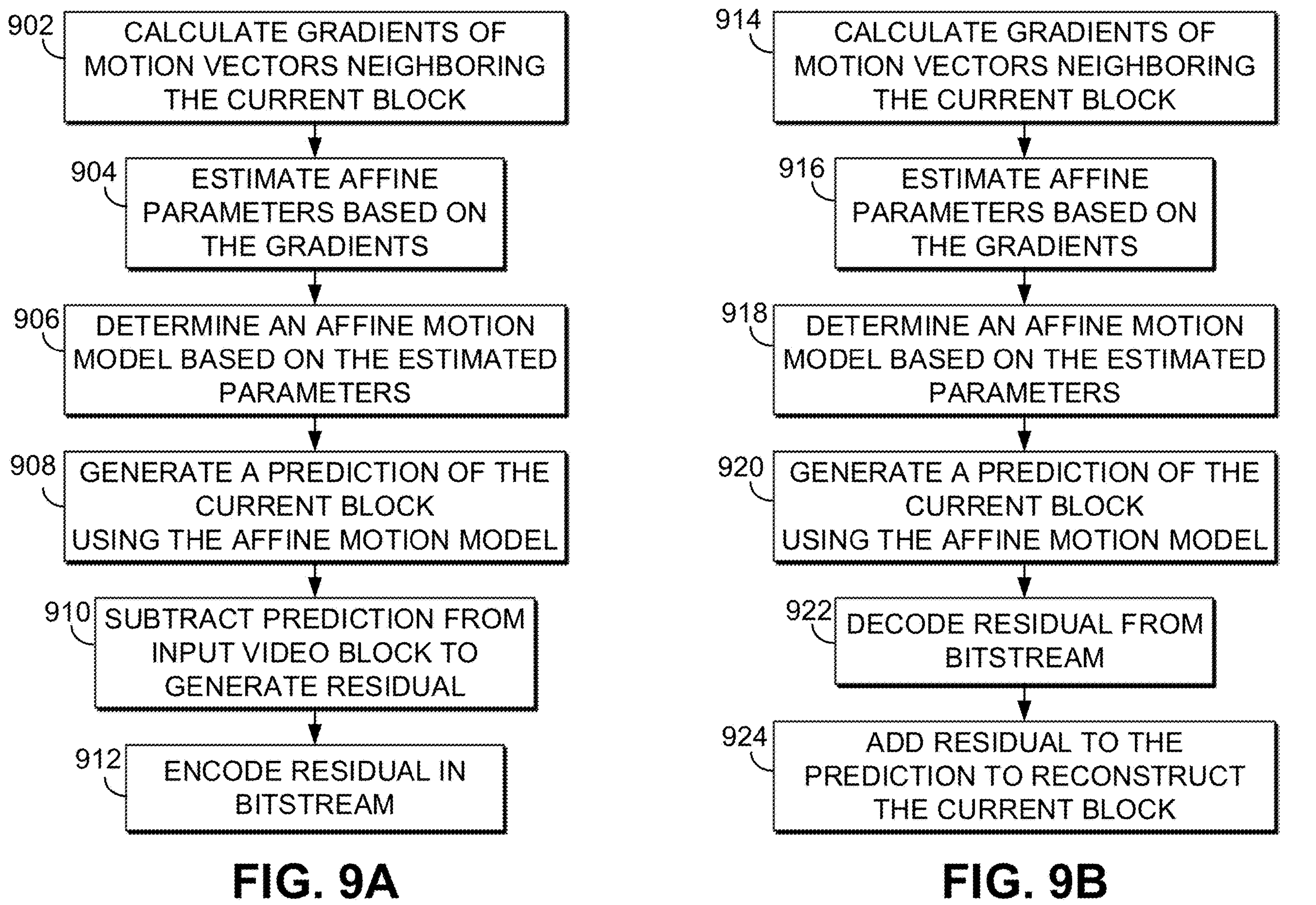
FIGS. 9A-9B are flow diagrams illustrating video encoding (9A) and decoding (9B) methods performed in some embodiments.

Example methods according to some embodiments are illustrated in FIGS. 9A and 9B. In some embodiments, a method as shown in FIG. 9A is performed, for example by an encoder to encode video in a bitstream. According to the method of FIG. 9A, for a current block in a video to be encoded at least one motion vector gradient is determined (902) from respective motion vectors of a plurality of neighboring sub-blocks that neighbor the current block. An estimate of at least one affine parameter for the current block is determined (904) based on the motion vector gradient(s). An affine motion model is determined (906) based at least in part on the determined estimate of the affine parameter. A prediction of the current block is generated (908) using the affine motion model. The functions illustrated at 902, 904, 906, 908 may be performed by, for example, motion prediction module 210 of FIG. 2A. In embodiments where the method of FIG. 9A is performed by an encoder, a residual may be calculated (910) by subtracting the prediction from an input block of video, and the residual may be encoded (912) in a bitstream (in some cases, after transformation and quantization).

In some embodiments, a method as shown in FIG. 9B is performed, for example by a decoder to decode video from a bitstream. According to the method of FIG. 9B, for a current block in a video to be decoded, at least one motion vector gradient is determined (914) from respective motion vectors of a plurality of neighboring sub-blocks that neighbor the current block. An estimate of at least one affine parameter for the current block is determined (916) based on the motion vector gradient(s). An affine motion model is determined (918) based at least in part on the determined estimate of the affine parameter. A prediction of the current block is generated (920) using the affine motion model. The functions illustrated at 914, 916, 918, 920 may be performed by, for example, motion compensated prediction module 260 of FIG. 2B. In embodiments where the method of FIG. 9B is performed by a decoder, a residual associated with the current block may be decoded (922) from a bitstream (in some cases, including inverse quantization and inverse transformation). The current block may be reconstructed (924) by adding the residual to the affine prediction of the current block.

As is illustrated in FIGS. 9A-9B, some example embodiments allow for encoding and decoding video using estimated affine parameters. Without explicit signaling of affine parameters, the number of bits used to encode a video may be reduced.

Coded Bitstream Structure.

FIG. 7 is a diagram illustrating an example of a coded bitstream structure. A coded bitstream 1300 consists of a number of NAL (network abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 8:
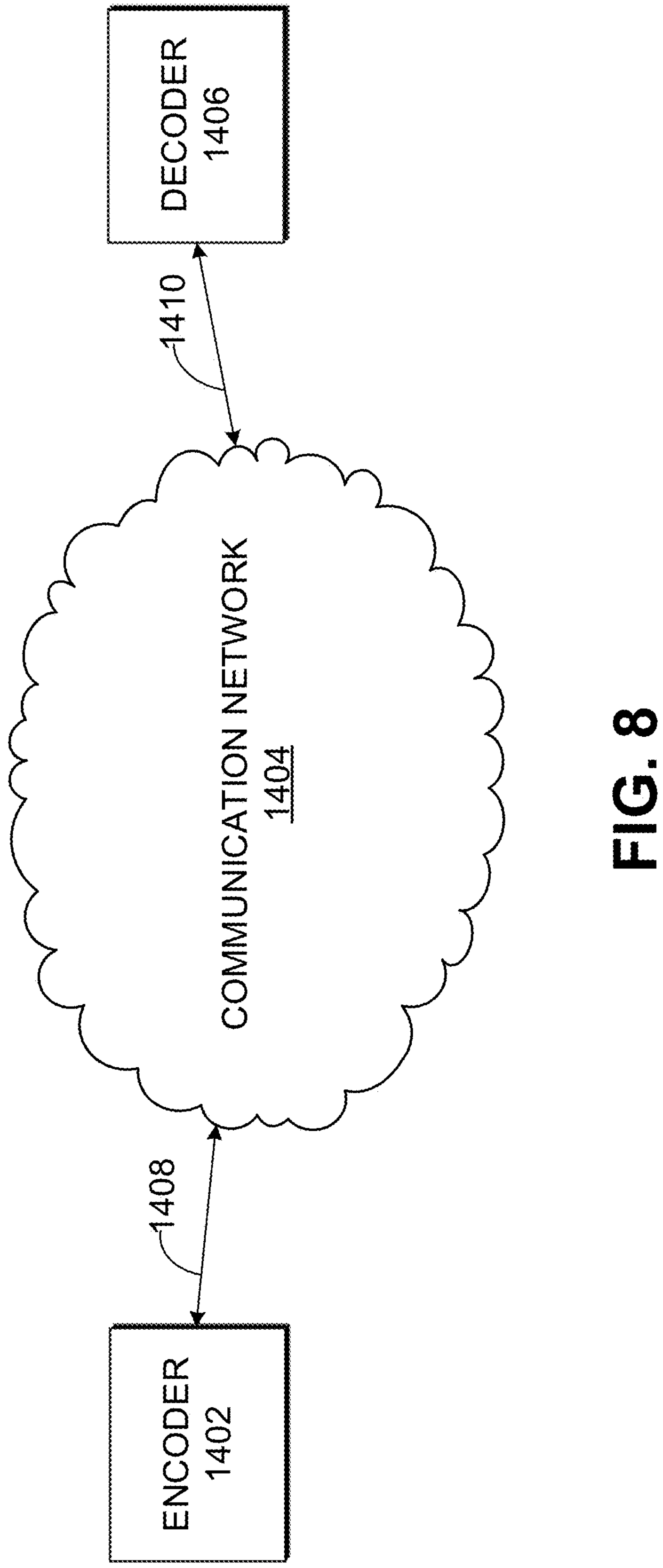
FIG. 8 is a diagram illustrating an example communication system.

FIG. 8 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

FURTHER EMBODIMENTS

Systems and methods are described for video coding using affine motion prediction. In an example method of coding video in a bitstream, for a current block of video, at least one motion vector gradient is determined from respective motion vectors of sub-blocks neighboring the current block. An estimate of at least one affine parameter for the current block is determined based on the motion vector gradient. In some embodiments, the current block is predicted with an affine motion model using the determined estimate of the affine parameter. In some embodiments, the estimated affine parameter is used to generate a first affine motion model, and the first affine motion model is used as a predictor of a second affine motion model that is ultimately used to predict the current block. In some embodiments, the estimated affine parameter is used as an input to an affine motion refinement process (e.g. based on optical flow). In some embodiments, only neighboring sub-blocks above the current block are used in estimating the affine parameter(s). In some embodiments, only neighboring sub-blocks to the left of the current block are used in estimating the affine parameter(s). In some embodiments, sub-blocks to the left of the current block are used in estimating one or more affine parameters while sub-blocks above the current block are used in estimating one or more other affine parameters.

In some embodiments, a method is provided for coding video in a bitstream, the method including, for at least one current block of video: determining at least one motion vector gradient from respective motion vectors of a plurality of neighboring sub-blocks neighboring the current block; and determining an estimate of at least one affine parameter for the current block based on the at least one motion vector gradient.

In some embodiments, the method further includes generating a prediction of the current block with an affine motion model using the determined estimate of the affine parameter.

In some embodiments, the method further includes: determining a first affine motion model using the determined estimate of the affine parameter; using the first affine motion model as a predictor of a second affine motion model; and generating a prediction of the current block using the second affine motion model.

In some embodiments, the method includes: determining a first affine motion model using the determined estimate of the affine parameter; providing the first affine motion model as an input to an affine model refinement process; generating a second affine motion model using the affine model refinement process; and generating a prediction of the current block using the second affine motion model. In some such embodiments, the affine model refinement process is based on optical flow.

In some embodiments, the neighboring sub-blocks include only sub-blocks above the current block. In some embodiments, the neighboring sub-blocks include only sub-blocks to the left of the current block.

In some embodiments, the affine parameter is $a'_{xx}$, and $a'_{xx}$ is estimated as an average of x-direction gradients of x-components of motion vectors of the plurality of neighboring sub-blocks. In some embodiments, the affine parameter is $a'_{xy}$, and $a'_{xy}$ is estimated as an average of y-direction gradients of x-components of motion vectors of the plurality of neighboring sub-blocks. In some embodiments, the affine parameter is $a'_{yx}$, and $a'_{yx}$ is estimated as an average of x-direction gradients of y-components of motion vectors of the plurality of neighboring sub-blocks. In some embodiments, the affine parameter is $a'_{yy}$, and $a'_{yy}$ is estimated as an average of y-direction gradients of y-components of motion vectors of the plurality of neighboring sub-blocks.

Some embodiments further include determining affine parameters $b'_x$ and $b'_y$ using:

$$b'_x = \overline{MV_x} - a'_{xx}\overline{x} - a'_{xy}\overline{y}$$

$$b'_y = \overline{MV_y} - a'_{yx}\overline{x} - a'_{yy}\overline{y}$$

where $\overline{MV_x}$, $\overline{MV_y}$, x and y are the average of $MV_x$, $MV_y$, x and y of a plurality of neighboring sub-blocks.

Some embodiments further include determining affine parameters $b'_x$ and $b'_y$ using:

$$b'_x = MV_x^{TL} - a'_{xx}x^{TL} - a'_{xy}y^{TL}$$

$$b'_y = MV_y^{TL} - a'_{yx}x^{TL} - a'_{yy}y^{TL}$$

where $MV^{TL}$, $x^{TL}$ and $y^{TL}$ are the motion vector and location of the top-left neighboring sub-block.

Some embodiments further include determining sub-block motion vectors of a plurality of sub-blocks in the current block.

Some embodiments include adaptively determining the size of sub-blocks within the current block based on a size of the current block. In some such embodiments, the size of sub-blocks within the current block is selected such that the sub-blocks have the same aspect ratio as the current block. In some embodiments, the size of the sub-blocks within the current block is selected to have a minimum lateral size, wherein the minimum lateral size is determined based on whether the current block is uni-predicted or bi-predicted.

In some embodiments, the method further includes, at an encoder: calculating a residual representing a difference between an affine prediction of the current block and an input block; and encoding the residual in the bitstream.

In some embodiments, the method further includes, at a decoder, decoding from the bitstream a residual representing a difference between an affine prediction of the current block and the input block; and reconstructing the current block by adding the residual to the affine prediction.

Some embodiments include a processor and a computer-readable medium (e.g. a non-transitory medium) storing instructions operative to perform any of the methods described herein.

Some embodiments include a computer-readable medium (e.g. a non-transitory medium) storing a video encoded using any of the methods described herein.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding method comprising:

obtaining an affine motion model for prediction of a current block;

selecting a sub-block size for sub-blocks of the current block, wherein the sub-block size is based on a shape of the current block, wherein the sub-block size has a first lateral dimension selected to be a minimum lateral size and a second lateral dimension selected according to an aspect ratio of the current block, and wherein the minimum lateral size is determined based on whether the current block is uni-predicted or bi-predicted;

determining a respective motion vector for each of the sub-blocks using the affine motion model; and predicting the sub-blocks of the current block based on the respective motion vectors.

2. The method of claim 1, wherein the sub-block size is selected to have an aspect ratio the same as an aspect ratio of the current block.

3. The method of claim 1, wherein the sub-block size is selected from a plurality of sizes including at least 4×4 and 4×8.

4. A video decoding apparatus comprising one or more processors configured to perform at least:

obtaining an affine motion model for prediction of a current block;

selecting a sub-block size for sub-blocks of the current block, wherein the sub-block size is based on a shape of the current block, wherein the sub-block size has a first lateral dimension selected to be a minimum lateral size and a second lateral dimension selected according to an aspect ratio of the current block, and wherein the minimum lateral size is determined based on whether the current block is uni-predicted or bi-predicted;

determining a respective motion vector for each of the sub-blocks using the affine motion model; and predicting the sub-blocks of the current block based on the respective motion vectors.

5. The apparatus of claim 4, wherein the sub-block size is selected to have an aspect ratio the same as an aspect ratio of the current block.

6. The apparatus of claim 4, wherein the sub-block size is selected from a plurality of sizes including at least 4×4 and 4×8.

7. A video encoding method comprising:

obtaining an affine motion model for prediction of a current block;

selecting a sub-block size for sub-blocks of the current block, wherein the sub-block size is based on a shape of the current block, wherein the sub-block size has a first lateral dimension selected to be a minimum lateral size and a second lateral dimension selected according to an aspect ratio of the current block, and wherein the minimum lateral size is determined based on whether the current block is uni-predicted or bi-predicted;

determining a respective motion vector for each of the sub-blocks using the affine motion model; and predicting the sub-blocks of the current block based on the respective motion vectors.

8. The method of claim 7, wherein the sub-block size is selected to have an aspect ratio the same as an aspect ratio of the current block.

9. The method of claim 7, wherein the sub-block size is selected from a plurality of sizes including at least 4×4 and 4×8.

10. A video encoding apparatus comprising one or more processors configured to perform at least:

obtaining an affine motion model for prediction of a current block;

selecting a sub-block size for sub-blocks of the current block, wherein the sub-block size is based on a shape of the current block, wherein the sub-block size has a first lateral dimension selected to be a minimum lateral size and a second lateral dimension selected according to an aspect ratio of the current block, and wherein the minimum lateral size is determined based on whether the current block is uni-predicted or bi-predicted;

determining a respective motion vector for each of the sub-blocks using the affine motion model; and predicting the sub-blocks of the current block based on the respective motion vectors.

11. The apparatus of claim 10, wherein the sub-block size is selected to have an aspect ratio the same as an aspect ratio of the current block.

12. The apparatus of claim 10, wherein the sub-block size is selected from a plurality of sizes including at least 4×4 and 4×8.

* * * * *